United States Patent [19]

Cantalapiedra Benjumea

[11] 4,093,426
[45] June 6, 1978

[54] METHOD OF AND APPARATUS FOR THE LIQUID CONTACT OF DUST FROM A HOT-GAS STREAM AND DRYING SLUDGE

[75] Inventor: Juan Cantalapiedra Benjumea, Madrid, Spain

[73] Assignee: Metallgesellschaft Aktiengesellschaft, Frankfurt am Main, Germany

[21] Appl. No.: 807,329

[22] Filed: Jun. 16, 1976

[30] Foreign Application Priority Data

Jun. 18, 1976 Spain .................................... 448.984

[51] Int. Cl.² .............................................. B03C 1/00
[52] U.S. Cl. ........................................ 55/8; 55/10; 55/122; 55/126; 55/312; 34/10; 34/61
[58] Field of Search .................. 34/12, 60, 61, 72, 10; 55/18, 19, 10, 122, 124–126, 312

[56] References Cited

U.S. PATENT DOCUMENTS

| 2,696,892 | 12/1954 | Campbell | 55/8 |
| 2,758,666 | 8/1956 | Prentiss | 55/124 |
| 3,444,668 | 5/1969 | Masuda | 55/122 |

*Primary Examiner*—Bernard Nozick
*Attorney, Agent, or Firm*—Karl F. Ross

[57] ABSTRACT

A hot-gas stream containing suspended solids (e.g., dust), generally from a cement-clinker kiln, is cooled and treated with a liquid (generally water) in a cooling tower after which the gas stream is subjected to electrostatic precipitation to remove entrained particles. Particles which settle in the tower are removed and dried by direct contact with a portion of the hot-gas stream branched from the main stream before it enters the tower. The dried particles are separated, preferably after comminution, in a cyclone from the partial stream which is returned to the main stream before it is subjected to electrostatic precipitation.

10 Claims, 4 Drawing Figures

METHOD OF AND APPARATUS FOR THE LIQUID CONTACT OF DUST FROM A HOT-GAS STREAM AND DRYING SLUDGE

FIELD OF THE INVENTION

The present invention relates to a method of and to an apparatus for the removal of entrained particles from a gas stream and, more particularly, to the treatment of hot-gas streams from cement-clinker kilns and the like to remove particulates therefrom.

BACKGROUND OF THE INVENTION

In numerous industrial applications it is necessary to remove particulates from a hot-gas stream before the gas is discharged into the atmosphere, subjected to chemical treatment, is recycled for reuse, etc. The particles may, in turn, be subjected to a subsequent treatment, e.g., to convert them into a useful product, can be recycled to an earlier stage in chemical, metallurgical and industrial processing, can be recovered for reuse without modification, or can be discarded.

The removal of particulates from a hot-gas stream is exemplified in the treatment of the hot gases produced by plants for the production of cement clinker by the dry process. In such plants, the cement components are passed through a kiln in which the composition is brought into contact with a hot gas, generally produced by combustion of a fuel, the cement clinker being removed from the kiln. The exhaust gases from the kiln are at a high temperature and entrain particulates which cannot be released into the environment with the exhaust gas, so that processes have been developed for the removal of the particles from the gas.

The removed particles can be recycled to an earlier stage in a cement plant since they contain various useful cement components. A cement plant may also give rise to hot gases entraining particulates of this type at other stages, e.g., dryers, mills.

It is the common practice to recover the particulates from the hot gases entraining same at least in part with the aid of electrostatic precipitators. As is well known, the electrostatic precipitation process produces, by corona discharge in the gas, an electrical charge on the solid particles which are entrained therewith, the particles being attracted to oppositely charged collector electrodes which may be rapped from time to time to deposit the accumulated particles in dust bins or the like from which the particles may be withdrawn.

It has also been recognized for some time, in connection with the use of electrostatic precipitators, that it is desirable to maintain the humidity of the gas entering the electrostatic precipitator above a certain level for optimum operation of the electrostatic precipitator. In other words, with moisture contents below a predetermined level, the dust-removal efficiency of the electrostatic precipitator falls and it is possible that an electrostatic precipitator of a given capacity may not be able to process completely all of the gas which must be treated, gas which contains an excessive proportion of entrained particles, or particulate-containing gases of fluctuating throughput.

Thus it has been proposed heretofore to "condition" the gases entering a system for the electrostatic removal of particulates from the gas by increasing the moisture content thereof.

In this connection it is known to provide upstream of an electrostatic precipitator or group of electrostatic precipitators, a conditioning unit which can be used to increase the moisture content of the particulate-containing gas stream. It has been found to be advantageous to combine this moisturezation unit with a cooling tower in which the temperature of the gas is reduced. In such a tower, the gas stream may be passed along a vertical path which can be controlled by elements within the tower to minimize turbulence, while being subjected to treatment with a fine water spray. The water is thus atomized directly into the gas stream within this tower.

As a result, the gas emerging from the tower has an increased dewpoint, humidity or moisture content and a lower temperature, efforts being made within the tower to ensure homogeneous distribution of the moisture in the gas.

Invariably in such a tower, moist particulates, i.e., dusts, are settled out of the gas and accumulate at the bottom of the tower even if the gas outlet is provided at the region of the bottom of the tower. This accumulation of settled dust tends to form because of the decrease in the velocity of the gas within the tower, resulting in a sedimentation effect, increase in the mass of particles by moisturization, partial agglomeration of particles and for numerous other reasons which are not material to the improvements to be described below.

The dust which settles at the base of the tower is customarily discharged therefrom by screw conveyors, lock chambers in which the lock compartments are defined by star wheels, and like discharge devices well known to the art.

However, the handling of thesettled dust which is thus removed from the tower poses significant problems. For example, if the moisture content of the dust is high, i.e., the dust is in the form of sludge, it cannot be readily stored or handled and hence must be subjected to drying and processing in separate equipment. It is impractical to reintroduce the moist dust into the tower since this tends to increase the agglomeration effect and presents difficulties with respect to distributing the dust uniformly in the tower and interferes with the moisturization of the gas. It has thus been the practice to simply discard the moist dust and accept the inconveniences which result therefrom.

Finally, in connection with the prior-art systems mention may be made of the fact that recycling of the moist dust or the sludge, and any procedures involved in the handling thereof remote from the cooling tower, have resulted in caking of the solids on the walls of the apparatus concerned, including the walls of the cooling tower, to the detriment of the process efficiency.

OBJECTS OF THE INVENTION

It is the principal object of the present invention to provide an improved method of moving particulates from a hot gas entraining same whereby the aforedescribed disadvantages are obviated and the overall efficiency of the process is improved while maintenance of the equipment involved is reduced.

Another object of this invention is to provide an apparatus which obviates the drawbacks of the prior-art systems described previously.

Yet another object of the invention is to provide an improved tower assembly for the processing of gases adapted to be subject to electorstatic precipitation.

Still another object is to provide an improved method of operating a plant for the recovery of dust from a gas stream entraining same, particularly from a cement-clinker kiln or plant.

SUMMARY OF THE INVENTION

These objects and others which will become apparent hereinafter are attained, in accordance with the present invention in a method which provides that, at the base of the cooling tower, the settled solids are discharged via a gas lock and are subjected, below the cooling tower, to drying with a portion of the hot gases branched from the main stream before the latter enters the cooling tower, this portion being moisturized or "conditioned" in the manner described by direct heat and mass exchange with the moist solids which have been removed from the tower before being returned to the mainstream before it enters the first electrostatic precipitator.

As a consequence, the collected solids are obtained in a dry state and can be combined with the dry solids recovered from the electrostatic precipitator for handling with these solids without any special concern. Moreover, the portion of the gas stream which is used to dry these solids is in turn cooled and moisturized so that it can enter the precipitator with the same moisture content and temperature as the remainder of the main stream which has traversed the cooling tower. Thus, difficulties hitherto encountered in the handling of sludge are eliminated, the plant structure is simplified, maintenance requirements for the plant are reduced, and the dust removal apparatus has increased applicability in the processing of the gases of cement plants and other chemical, metallurgical and industrial plants. The efficiency of the electrostatic precipitator is increased and the gases entering same can have an optimum temperature and moisture content.

The dust may be removed from the settled quantity at the base of the tower at a relatively low rate so that only a small portion of the main stream may be branched to the drying chamber provided below the cooling tower. Advantageously, milling means in provided for comminuting the dried dust.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
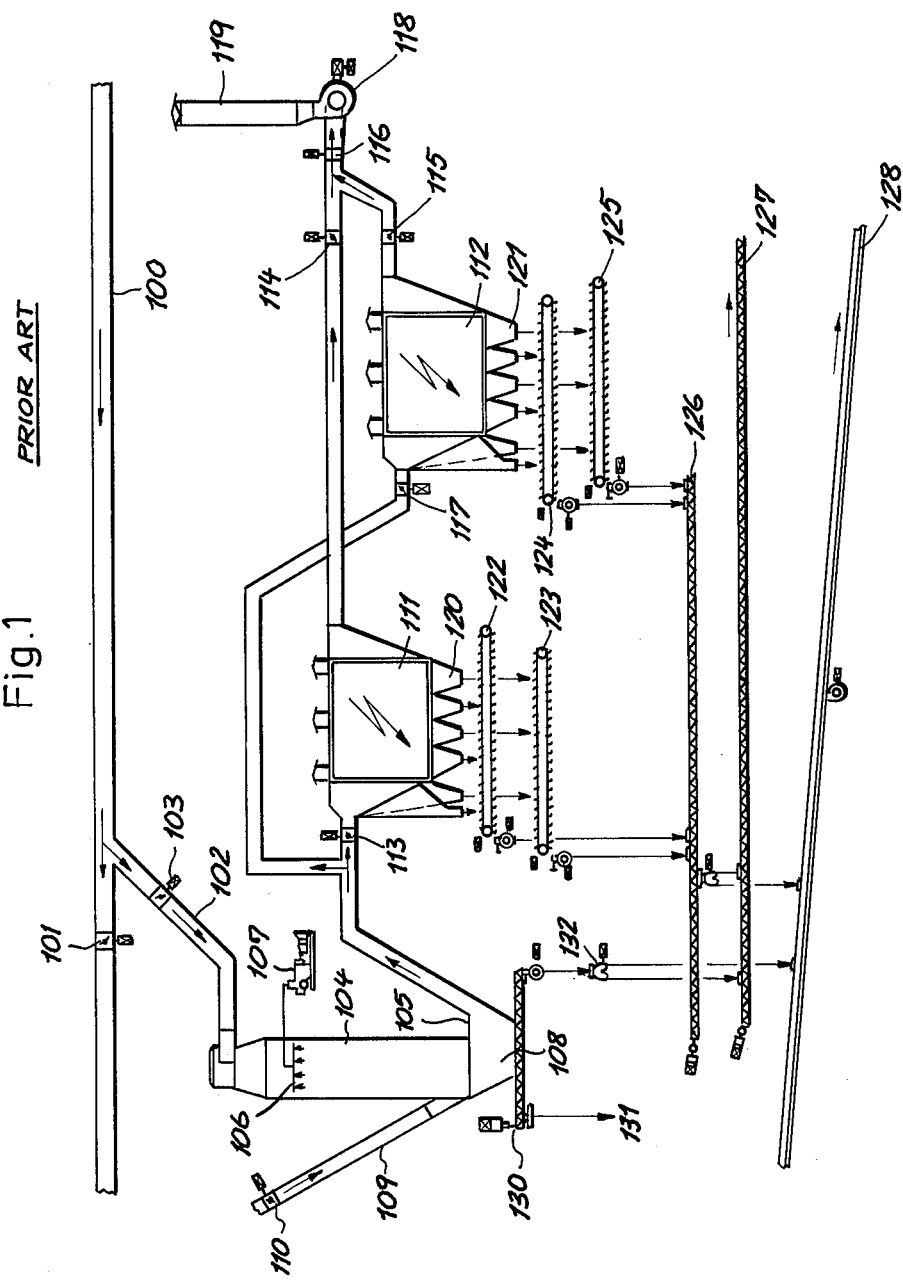
FIG. 1 is a flow diagram illustrating a prior-art plant for the removal of dust from a hot-gas stream obtained from a cement-clinker kiln.

In FIG. 1 there is shown a prior-art plant for the removal of dust from a hot-gas stream arriving from a cement plant via a conduit 100, generally from the cement-clinker kiln of this plant.

The conduit 100 may lead to a plurality of such dust-removal plants and hence is provided with a valve 101 to control the proportion of gas delivered to each of the dust-removal installations.

The hot-gas stream to be subjected to dust removal in the installation of FIG. 1 is branched from the duct 100 by a pipe 102 provided with a valve 103 and delivered to a cooling tower 104 which can be of the type described, i.e., can be provided with internal baffling to ensure a practically turbulence-free downward movement of the gas to its outlet 105 at the base of the tower. Atomizing nozzles 106 are provided in the tower to spray water into the descending gas, the water being supplied via a pump 107 represented diagrammatically. Settled solids collect in a bin 108 at the base of the tower 104 and additional solids from an earlier separation stage can be fed to the bin 108 via a conduit 109 which can also deliver a gas to be added to the gases subjected to electrostatic precipitation. The conduit 109 is provided with a valve 110.

The gases discharged from the base of the tower via outlet 105 are delivered to two parallel-connected electrostatic precipitators 111 and 112, the proportioning of the bases between these electrostatic precipitators being determined by valves 113, 114, 115, 116 and 117 in the ducts leading into and out of the electrostatic precipitators. The gas is induced to flow through the system by a blower 118 which discharges into a stack 119 by which the particulate-free gas is discharged into the atmosphere.

The bins 120 and 121 of the electrostatic precipitators 111 and 112 discharge the dry solid product onto conveyers 112, 123 and 124, 125 which meter the solids to respective inlets of a screw conveyor 126, the latter serving to blend the collected solids and deliver them to a screw conveyor 127 or a pneumatic conveyor 128 for delivery elsewhere to the cement plant.

The solids collected in the bin 128 can be discharged from the system as a sludge via the screw conveyor 130 and its outlet 131 if the moisture content precludes convenient handling. Alternatively, the screw conveyor 130 can feed the solids to the screw conveyor 127 via distributor 132, or through the pneumatic conveyor 128 as desired.

Naturally, the plant illustrated in FIG. 1 operates in accordance with the prior-art principles discussed above with all of the drawbacks of the art.

Figure 2:
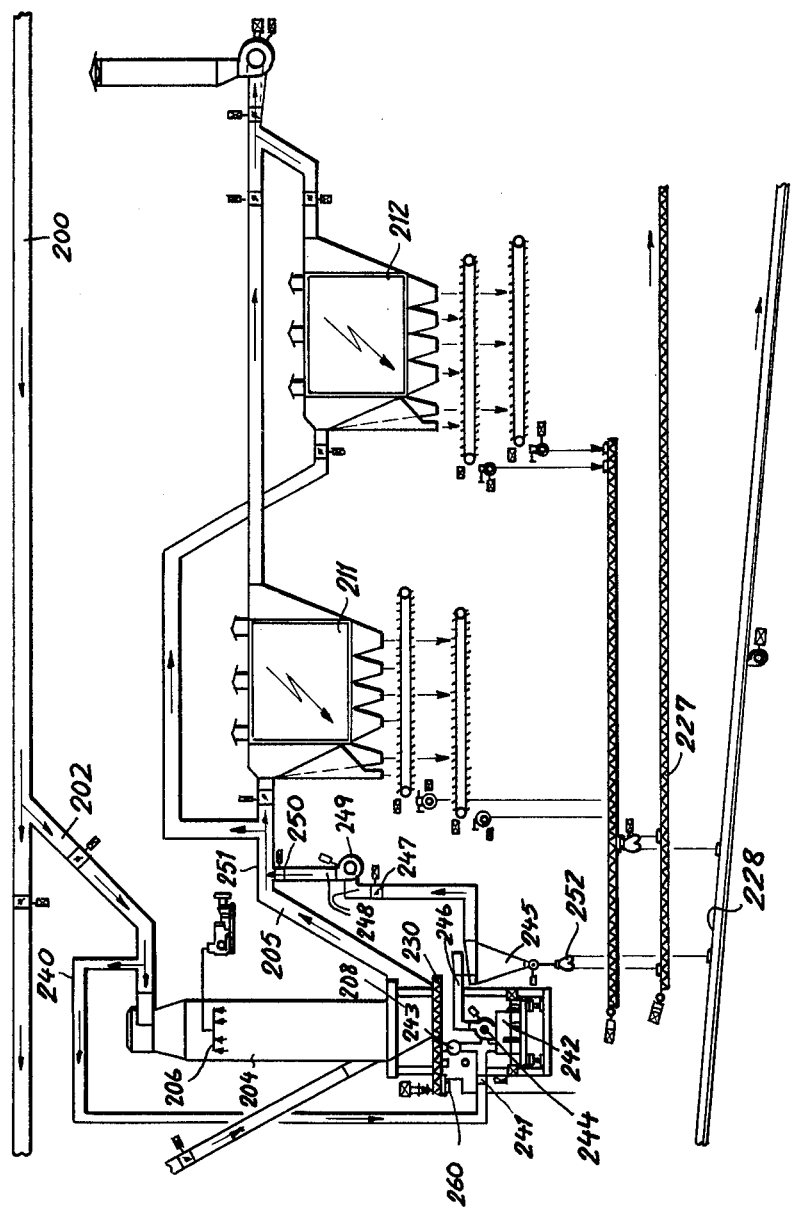
FIG. 2 is a flow diagram of a plant modified in accordance with the present invention.

FIG. 2 shows a plant in accordance with the present invention in which corresponding structure has been represented with corresponding numerals in the 200 series and hence only the structure relating to the improvement of the invention will be described in greater detail in connection with FIG. 2.

From the conduit 202 delivering the main stream of the hot particle-entraining gas to the cooling tower 204, there is a branched duct 240 which, under the control of a valve 241, delivers a portion of this hot gas to a drying chamber 242 located below the tower 204. The bin 208 of the tower 204 is provided with the conveyor 230 which, however, delivers the collected dust through a lock chamber 243 to the drying plant 242 which can be formed with a comminutor or grinder as will be apparent from FIGS. 3 and 4 to be described below.

The partially cooled and moisturized gas is supplied by a blower 244 to the inlet of a cyclone 245 via a conduit 246 in which the dust entrained with this portion of the gas is separated. This dust, of course, results from the drying of the particulates within the drying and comminuting plant 244. The gases emerging from the cyclone are, at a rate controlled by a valve 247, blown via duct 248 and blower 249 past a valve 250 into a duct 251 communicating with the electrostatic precipitators 211 and 212. The outlet 205 from the cooling tower 204 also opens into duct 251.

The solids recovered in the cyclone 245 are fed by the distributor 252 to either the screw conveyor 227 or the pneumatic conveyor 228, each of which is analogous to the respective conveyor described in connection with FIG. 1.

A lock chamber 260 or other valve ensures that the settled solids can be removed, if desired, during maintenance work on the drying chamber 244, the milling equipment or associated parts. The valve 250 and the valve 241 are preferably hinged valves which can be closed to isolate the system including the drying chamber 244 for repairs.

Figure 4:
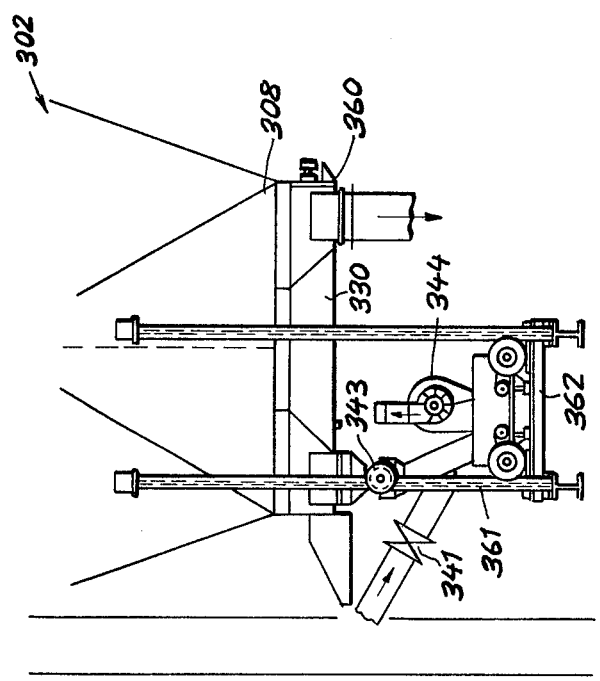
FIG. 4 is a view taken in the direction of the arrow IV of FIG. 3.
Figure 3:
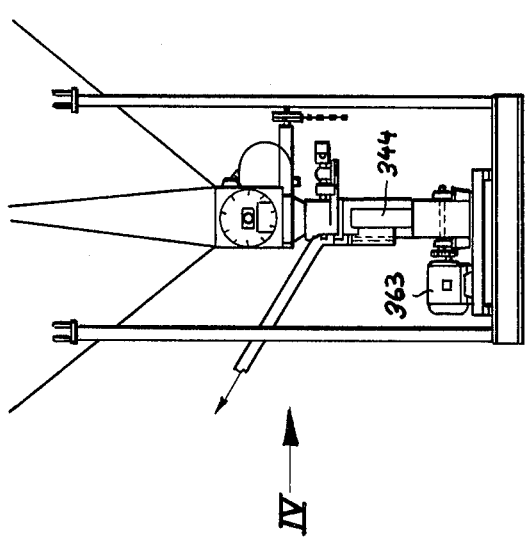
FIG. 3 is a cross-sectional view through the lower portion of the cooling tower which can be used in the plant of FIG. 2.

FIGS. 3 and 4 show the drying and milling station in greater detail and some of the structure associated therewith. The drying chamber 342 may be suspended on a platform 362 from the bottom of the bin 308 of the cooling tower 302 via posts 361 and can be surmounted by the blower 344 previously described. In connection with FIGS. 3 and 4, reference numerals corresponding to those of FIG. 2 but in the 300 series represent correspondingly functioning elements. The screw conveyor 330 is provided with the lock 360 which can be used to discharge the solids when the drying and grinding system is shut down and with the lock 343 for delivering those solids to the drying chamber 342 for normal operation. The interior of the chamber 342 is provided with pin mill drums driven by motors 363.

In operation, the settled solids are gradually metered into the drying station 242, 342 in which they are treated with the branched portion of the particulate-laden hot gas. The temperature of the hot gas is reduced and its moisture content is increased by mass transfer of moisture from the moist solids which are broken up by the pin mill driven by the motors 363. The gas stream entrains the particles into the cycle which preliminarily removes the particulates from this gas which is recombined with the gas leaving the cooling tower and introduced into the electrostatic precipitator.

SPECIFIC EXAMPLE

With a gas flow rate of 120 m³/h corresponding to 52000 m³/h at standard temperature for pressure (stp) the moist dust collected in the cooler requires 7000 m³/h of the hot gas, corresponding to 3000 m³/h (stp). In other words, 5.45% of total available hot gas is used for drying the collected solids. The gas as entry into the cooler 104, 204 has a temperature of about 350° C and is treated therein with water which is sprayed into the cooler at a rate of 7 m³/h. The gas exiting from the cooler has a temperature of 150° C. The gas entering the cooler has a solids content (dust) of 40 g/m³. 6g/m³ of the solids are collected in the base of the cooler and treated with the 5.45% of the hot gas previously mentioned. The dust removed from the gas in the cooler thus corresponds to about 15% of the dust entering the cooler with the gas. 720 kg of the dust are thus treated per hour in accordance with the invention. On the average, for each kg of dust collected at the bottom of the tower, 10 m³ of the uncooled hot gas is bypassed around the cooler to dry the dust.

The bypassed gas (about 3000 m³/h (stp)) is free from particulates in the cyclone until it has a dust content of at most 34 g/m³ and is combined at the temperature of 150° C with the 52000 m³/h (stp) of the gas emerging from the cooler at the same temperature. The combined gas stream is then passed into electrostatic precipitators where practically the entire remainder of the dust is removed. The dust recovered in a dry state from the electrostatic precipitator is combined with the dust recovered from the cyclone and returned to the cement clinker kiln.

I claim:

1. In a method for the removal of solids from a hot-gas stream entraining particles of said solids wherein said hot-gas stream is cooled, treated with a liquid with settling of particles therefrom, and thereafter subjected to electrostatic precipitation, the improvement which comprises:

separating settled particles from the gas stream from which the particles settle;

branching a portion of a main stream of the hot-gas stream from the remainder of the main stream prior to the cooling thereof;

contacting the separated settled particles with the branched portion of said hot-gas stream to cool the branched portion and dry the separated settled particles; and thereafter combining said cooled portion with the remainder of the main stream prior to electrostatic precipitation.

2. The improvement defined in claim 1 wherein said remainder of the main stream is subjected to a water spray during the cooling thereof and the separated particles are in moist condition when contacted with said portion of said hot-gas stream, said method further comprising entraining dried particles with the cooled portion, and separatiang the entrained dried particles from the cooled portion in a cyclone before combining said cooled portion with said remainder of said main stream.

3. The improvement defined in claim 2, further comprising the step of comminuting the solids during the drying thereof by said portion of said hot-gas stream.

4. The improvement defined in claim 3 wherein said remainder of said main stream is cooled and humidified in a cooling tower, the settled particles are recovered at the bottom of said tower, and the settled particles are treated with said portion of said hot-gas stream below said tower.

5. The improvement defined in claim 4 wherein the dry particles recovered from said cyclone are combined with particles recovered by electrostatic precipitation.

6. In an apparatus for the removal of solid particles from a hot-gas stream entraining same which comprises a cooling tower in which the gas is subjected to moisturization and at the bottom of which particles settle from the gas and at least one electrostatic precipitator traversed by the gas after it leaves the cooling tower, the improvement which comprises:

a drying chamber disposed below said tower;

means for feeding settled particles from said tower to said drying chamber;

means for branching a portion of said hot-gas stream from the remainder thereof prior to the entry of said remainder into said cooling tower and for feeding the branched portion into said drying chamber for the drying of particles therein;

a cyclone for separating particles from said portion subsequent to the drying of said particles thereby; and means for recombining said portion with said remainder upon the separation of particles from said portion in said cyclone.

7. The improvement defined in claim 6, further comprising respective valves downstream of said drying chamber and upstream of said cyclone for isolating said drying chamber and said cyclone and enabling the maintenance thereof.

8. The improvement defined in claim 7 wherein the means for feeding settled particles from said tower to said drying chamber comprises a screw conveyor, said apparatus further comprising a blower between said drying chamber and said cyclone.

9. The improvement defined in claim 7, further comprising a blower between said cyclone and said electrostatic precipitator.

10. The improvement defined in claim 7, further comprising milling means for comminuting solids in said drying chamber, and means for combining the particles separated in said cyclone with particles separated from gas in said electrostatic precipitator.

* * * * *